(12) United States Patent
Isle et al.

(10) Patent No.: US 6,954,982 B2
(45) Date of Patent: Oct. 18, 2005

(54) REUSABLE SHIPPING PALLET FORMED FROM EXTRUDED PLASTIC PARTS WHICH ARE EASILY ASSEMBLED AND DISASSEMBLED

(76) Inventors: Richard Belle Isle, 495 SE. 8th St., Deerfield Beach, FL (US) 33441; Gerald Davis, 8591 SW. 21st St., Davie, FL (US) 33324

( * ) Notice: Subject to any disclaimer, the term of this patent is extended or adjusted under 35 U.S.C. 154(b) by 10 days.

(21) Appl. No.: 10/237,494

(22) Filed: Sep. 9, 2002

(65) Prior Publication Data

US 2003/0070594 A1 Apr. 17, 2003

Related U.S. Application Data

(60) Provisional application No. 60/318,434, filed on Sep. 10, 2001, and provisional application No. 60/381,231, filed on May 17, 2002.

(51) Int. Cl.[7] ............................................. B23P 19/00
(52) U.S. Cl. ....................................... 29/799; 108/51.11
(58) Field of Search .......................... 29/426.1, 402.01, 29/402.03, 402.04, 402.06, 402.08, 402.09, 453, 469, 799; 108/51.11, 57.25, 56.3, 56.1

(56) References Cited

U.S. PATENT DOCUMENTS

| | | |
|---|---|---|
| 1,772,736 A | 8/1930 | Romine |
| 2,643,081 A | 6/1953 | Spring |
| 2,930,560 A | 3/1960 | Carnwath et al. |
| 2,971,768 A | 2/1961 | Ackley et al. |
| 3,267,884 A | 8/1966 | Lessheim |
| 3,316,861 A | 5/1967 | Dailey |
| 3,342,146 A | 9/1967 | Lessheim |
| 3,677,200 A | 7/1972 | Coccagna et al. |
| 3,678,868 A | 7/1972 | Hirota |
| 3,719,157 A | 3/1973 | Arcocha et al. |
| 3,812,792 A | 5/1974 | La Belle |
| 3,878,796 A | 4/1975 | Morrison |
| 3,971,326 A | 7/1976 | Svirklys |
| 4,316,419 A | 2/1982 | Cupido |
| 4,316,919 A | 2/1982 | Pelloso et al. |
| 4,350,099 A | 9/1982 | Persson |
| 4,359,948 A | 11/1982 | Judy et al. |
| 4,382,414 A | 5/1983 | Svirklys |
| 4,597,339 A | 7/1986 | McCaffrey et al. |
| 4,993,330 A | 2/1991 | Yen |
| 5,101,737 A | 4/1992 | Gomez |
| 5,170,722 A | 12/1992 | Friesner et al. |
| 5,438,098 A * | 8/1995 | Orikasa et al. ................ 525/63 |
| 5,440,998 A | 8/1995 | Morgan, IV et al. |

FOREIGN PATENT DOCUMENTS

| | | |
|---|---|---|
| JP | 2000326980 | * 11/2000 |
| WO | WO9725250 | * 7/1977 |
| WO | WO 91/13810 | 9/1991 |

* cited by examiner

Primary Examiner—John C. Hong
(74) Attorney, Agent, or Firm—Pandiscio & Pandiscio, P.C.

(57) ABSTRACT

There is disclosed a reusable shipping pallet formed from plastic parts and a method of assembling the same. The pallet comprises at least two I-beam constructs, each of the I-beam constructs having a first beam end, a second beam end and a longitudinal beam axis extending therethrough, each of the I-beam constructs having a top beam portion and a bottom beam portion, and each of the I-beam constructs having a dovetail projection along the top beam portion and extending in a direction parallel to the longitudinal beam axis; and at least one deck board having a first board end, a second board end and a longitudinal board axis extending therethrough, the at least one deck board having a top board portion and a bottom board portion, the at least one deck board having at least two dovetail slots formed in the bottom board portion, the dovetail slots being substantially perpendicular to the longitudinal board axis and being configured to compliment a shape of the dovetail projection; wherein the pallet is assembled by inserting each of the dovetail projections into a corresponding dovetail slot of the at least one deck board.

26 Claims, 19 Drawing Sheets

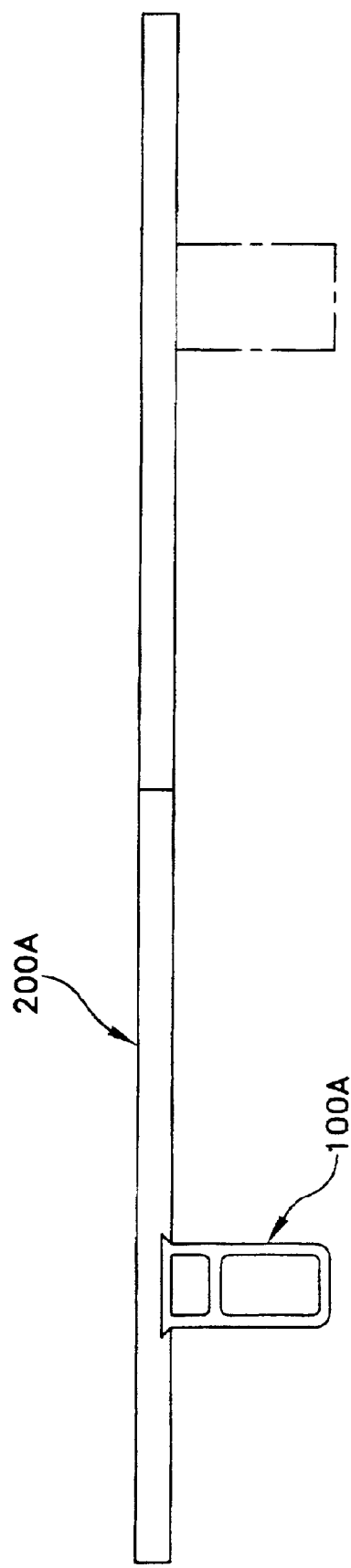

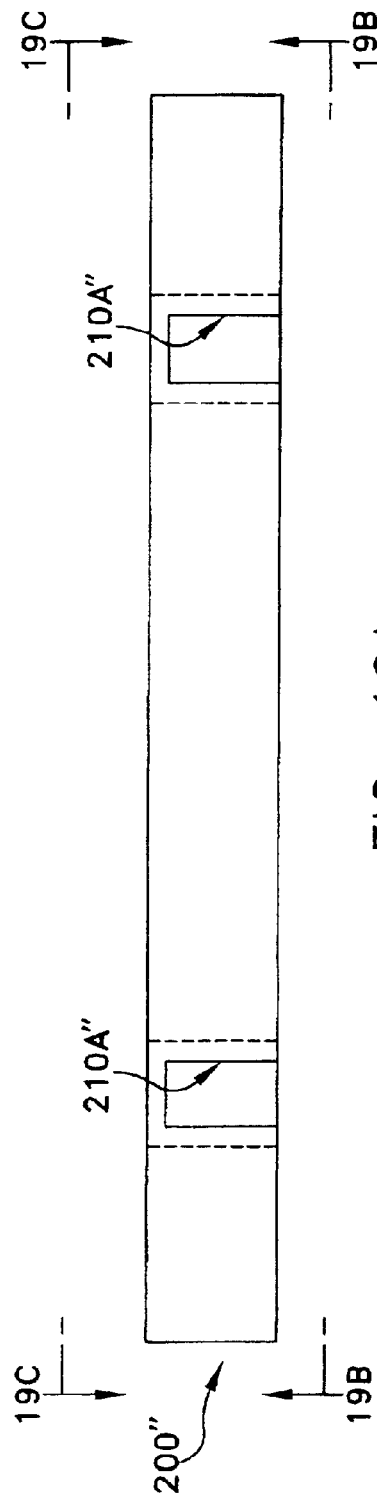
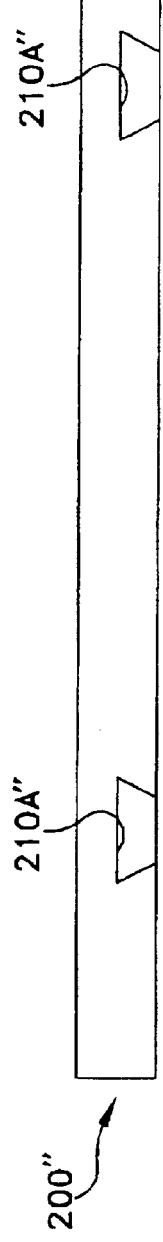
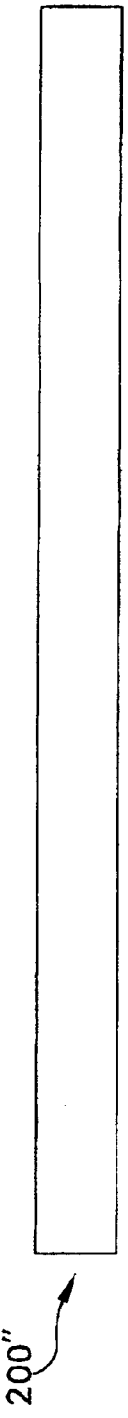
FIG. 19A
FIG. 19B
FIG. 19C

REUSABLE SHIPPING PALLET FORMED FROM EXTRUDED PLASTIC PARTS WHICH ARE EASILY ASSEMBLED AND DISASSEMBLED

REFERENCE TO PENDING PRIOR PATENT APPLICATIONS

This patent application claims benefit of:

(1) prior U.S. Provisional Patent Application Ser. No. 60/318,434, filed Sep. 10, 2001 by Richard Belle Isle et al. for REUSABLE SHIPPING PALLET FORMED FROM EXTRUDED PLASTIC PARTS WHICH ARE EASILY ASSEMBLED AND DISASSEMBLED, which patent application is hereby incorporated herein by reference; and (2) prior U.S. Provisional Patent Application Ser. No. 60/381,231, filed May 17, 2002 by Richard Belle Isle et al. for REUSABLE SHIPPING PALLET FORMED FROM EXTRUDED PLASTIC PARTS WHICH ARE EASILY ASSEMBLED AND DISASSEMBLED, which patent application is hereby incorporated herein by reference.

FIELD OF THE INVENTION

This invention relates to shipping pallets in general, and more particularly to reusable shipping pallets formed from extruded plastic parts.

BACKGROUND OF THE INVENTION

In 1999, over four hundred million wooden pallets were produced for use in shipping freight.

While wooden pallets are relatively inexpensive to produce, they are also relatively heavy and bulky. As a result, where freight is being shipped in only one direction (e.g., from a manufacturer to a distributor), the wooden pallets are generally discarded after use, since it is uneconomical to return the empty pallets to their origin. However, disposal can present a problem, since many landfill areas are now refusing to accept discarded pallets because they are not compactable. Consequently, many discarded wooden pallets must be converted to mulch, which can present additional costs.

Furthermore, even where it is practical to reuse the wooden pallets, the wooden pallets themselves can present problems. By way of example, the wooden pallets are typically fastened together using metal hardware such as nails, screws, and bolts with nuts. This metal hardware can rust over time and may work its way into the product which is being carried by the pallet, thereby contaminating the shipment. In this respect it should be noted that approximately sixty percent of pallet usage occurs in the food and pharmaceutical industries, where such contamination can present serious health risks.

SUMMARY OF THE INVENTION

As a result, one object of the present invention is to provide a new form of pallet which is relatively inexpensive to produce.

Another object of the present invention is to provide a new form of pallet which is relatively lightweight and compact.

And another object of the present invention is to provide a new form of pallet which is reusable.

Still another object of the present invention is to provide a new form of pallet which is easily assembled at the point of shipment and easily disassembled at the point of destination.

Yet another object of the present invention is to provide a new form of pallet which is particularly compact in its disassembled form, whereby to facilitate transferring the pallet to another location for reuse.

These and other objects are addressed by the present invention, which comprises a reusable shipping pallet formed from extruded plastic parts which are easily assembled and disassembled.

In one form of the invention, there is provided a reusable shipping pallet formed from extruded plastic parts, the pallet comprising: at least two I-beam constructs, each of the I-beam constructs having a first beam end, a second beam end and a longitudinal beam axis extending therethrough, each of the I-beam constructs having a top beam portion and a bottom beam portion, and each of the I-beam constructs having a dovetail projection along the top beam portion and extending in a direction parallel to the longitudinal beam axis; and at least one deck board having a first board end, a second board end and a longitudinal board axis extending therethrough, the at least one deck board having a top board portion and a bottom board portion, the at least one deck board having at least two dovetail slots in said bottom board portion, the dovetail slots being substantially perpendicular to the longitudinal board axis and being configured to compliment a shape of the dovetail projection; wherein the pallet is assembled by inserting each of the dovetail projections into a corresponding dovetail slot of the at least one deck board.

And in another form of the invention, there is provided a method for assembling a reusable shipping pallet formed from extruded plastic parts, the pallet comprising: providing a reusable shipping pallet formed from extruded plastic parts, the pallet comprising: at least two I-beam constructs, each of the I-beam constructs having a first beam end, a second beam end and a longitudinal beam axis extending therethrough, each of the I-beam constructs having a top beam portion and a bottom beam portion, and each of the I-beam constructs having a dovetail projection along the top beam portion and extending in a direction parallel to the longitudinal beam axis; and at least one deck board having a first board end, a second board end and a longitudinal board axis extending therethrough, the said at least one deck board having a top board portion and a bottom board portion, the at least one deck board having at least two dovetail slots in the bottom board portion, the dovetail slots being substantially perpendicular to the longitudinal board axis and being configured to compliment a shape of the dovetail projection; and inserting each of the dovetail projections into a corresponding dovetail slot of the at least one deck board.

BRIEF DESCRIPTION OF THE DRAWINGS

These and other objects and features of the present invention will be more fully disclosed or rendered obvious by the following detailed description of the preferred embodiment of the invention, which is to be considered together with the accompanying drawings wherein like numbers refer to like parts and further wherein:

FIG. 18 is a schematic sectional view showing the integral dovetail portion of the I-beam component shown in FIG. 15 installed in the dovetail slot formed in the deck board shown in FIG. 17; and FIGS. 19A–19C are schematic side views showing a dovetail slot partially cut into the I-beam.

DETAILED DESCRIPTION OF THE PREFERRED EMBODIMENTS

Figure 1:
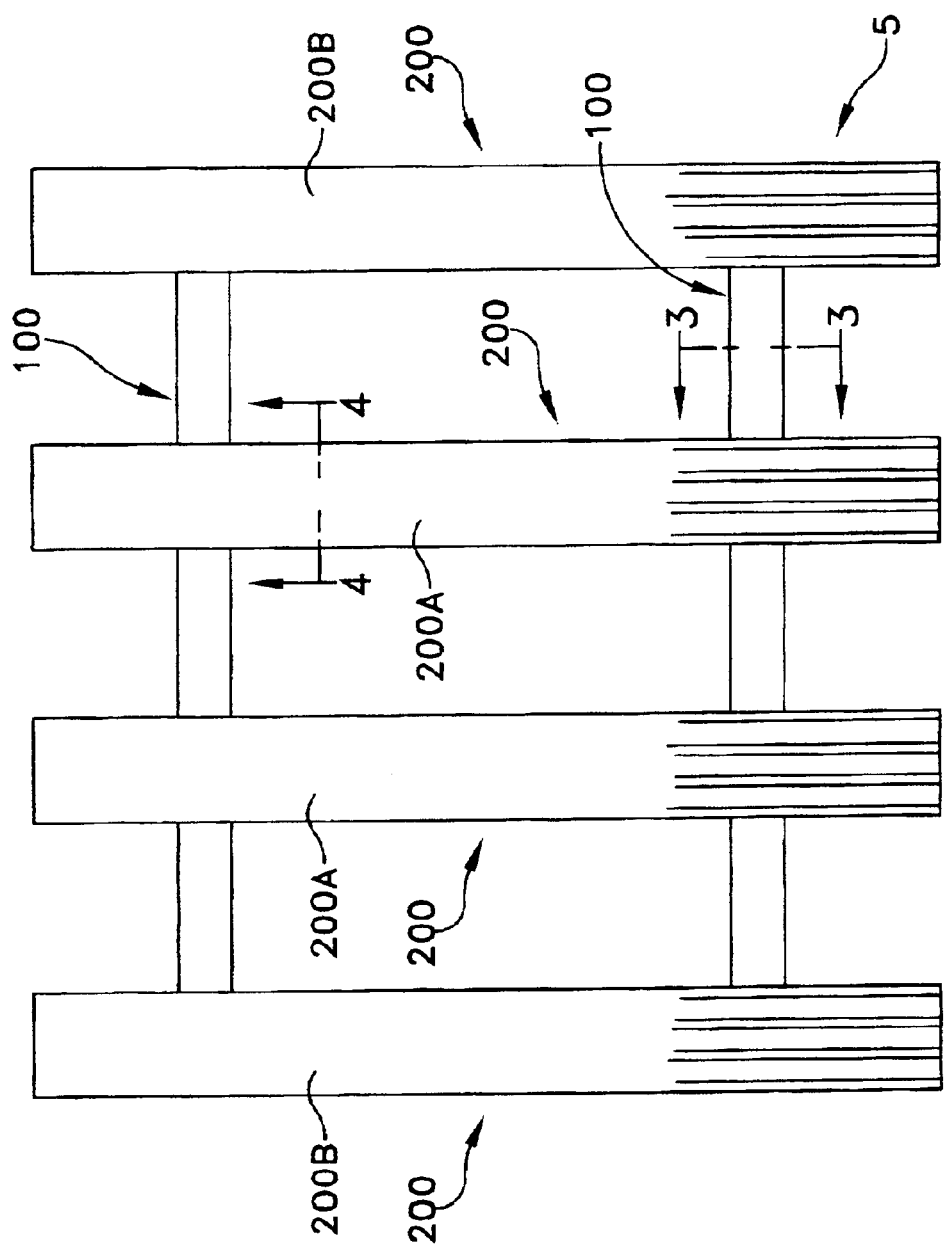
FIG. 1 is a schematic top view of a novel pallet formed in accordance with the present invention.
Figure 2:
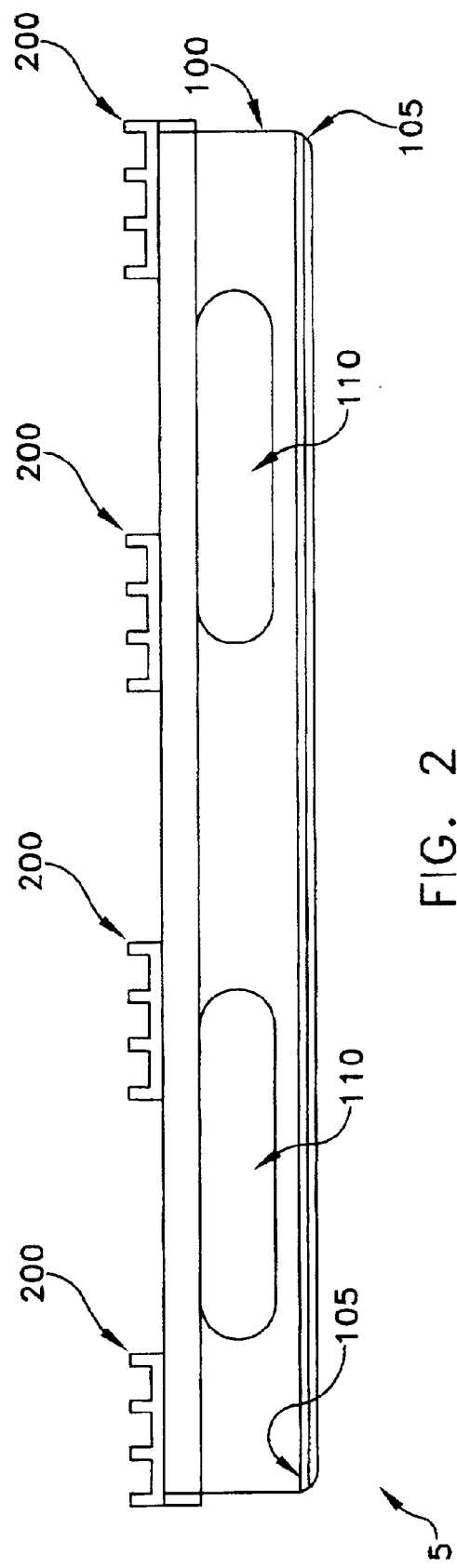
FIG. 2 is a schematic front view of the novel pallet shown in FIG. 1.

Looking first at FIGS. 1–4, there is shown a novel pallet 5 formed in accordance with the present invention. Pallet 5 generally comprises a plurality of I-beams 100, a plurality of deck boards 200 and a plurality of dovetail inserts 300 (FIG. 3) which are used to connect deck boards 200 to I-beams 100.

In general, pallet 5 is intended to be manufactured out of environmentally safe, recyclable polymers and copolymers that are preferably formulated with ultraviolet inhibitors (to resist degradation from the sun) and with modifiers (for strength). Currently, the choice of materials includes acrylics, rubbers, ethylenes, propylenes, urethanes, styrene glasses and structural foams. However, the present invention is not restricted to these particular materials; other appropriate materials may also be used. In this respect it should be appreciated that the particular materials used, and their specific formulations, may be varied according to a variety of factors including strength, durability, cost, etc. Thus, the choice of materials may be influenced by the weight of the load which is to be carried by the pallet. For example, where the pallet is to be used to carry a relatively light load (e.g., cornflakes), a particular blend may be used; correspondingly, where the pallet is to be used to carry a relatively heavy load (e.g., cinderblocks), a different blend may be used. Varying the formulation to suit the load may reduce the cost of the pallet where the pallet is intended to be consistently used with particular types of loads.

Specific colors can be introduced to the formulation at the customer's request. The use of different colors in the pallets can help with product identification in inventory and warehousing.

Also, company logos can be permanently embossed into the pallet for recognition, thereby facilitating return of the pallet to the proper owner.

Looking next at FIGS. 1–5, a plurality of I-beams 100 generally form the foundation of pallet 5. I-beams 100 are preferably formed by extrusion (although they may also be formed by another process, e.g., molding) and may have any desired length. In one preferred form of the invention, I-beams 100 have a length of approximately 36.5 inches. I-beams 100 have a cross-sectional configuration which is designed to provide maximum strength with minimum weight. In one preferred form of the invention, the interior of the I-beam is cored out so as to reduce weight while maintaining adequate strength in the vertical and horizontal planes. Each I-beam is preferably four inches high by two inches wide. In this respect it should be appreciated that the four inch height generally facilitates forklift and pallet jack entry into the completed pallet, such that the pallet can be lifted and moved about. Preferably the leading and trailing edges of each I-beam are rounded off, e.g., at 105 (FIG. 2), so as to reduce friction when the pallet is pushed or dragged forward.

If desired, oval cutouts 110 (FIG. 2) may also be formed in the I-beams after extruding, e.g., by machining. Such cutouts 110 permit forklift entry into the sides of the completed pallet, such that the pallet can be addressed from the sides (i.e., perpendicular to I-beams 100) as well as from the ends (i.e., parallel to I-beams 100). Preferably the side edges of each I-beam are rounded off, e.g., at 115 (FIG. 5), so as to reduce friction when the pallet is pushed or dragged sideways.

A pair of coplanar, inwardly-extending grooves 120 (FIG. 5) are formed in the sidewalls of the I-beam near the top and bottom ends of the beam. These grooves 120 receive counterpart tongues 305 (FIG. 8) formed on dovetail inserts 300, whereby dovetail inserts 300 (and hence deck boards 200) may be secured to I-beams 100, as will hereinafter be described in further detail. In this respect it will be appreciated that by placing grooves 120 near both the bottom and top of the I-beams, deck boards 200 may be secured to both the top and bottom ends of the I-beams. Such bottom deck boards may be necessary or desirable where additional strength is required.

Preferably, the I-beam is totally symmetrical about the vertical and horizontal axes, such that no specific orientation is required during use.

Looking next at FIGS. 1–4, 6 and 7, a plurality of deck boards 200 form the upper surface of pallet 5. Deck boards 200 are of two types: inner deck boards 200' (FIG. 1) and outer deck boards 200" (FIG. 1). Inner deck boards 200' and outer deck boards 200" are preferably identical to one another, except as will hereinafter be described.

Deck boards 200 are generally similar to a slat, except that they preferably have a series of parallel grooves 205 (FIG. 6) on the top surface thereof which serve as gutters for liquid (e.g., rainwater) run-off. This configuration reduces the amount of standing water that will contact the packaged product resting on the pallet and reduces pallet weight without sacrificing pallet strength.

The bottom surfaces of the deck boards 200 have dovetailed slots 210 (FIG. 7) formed therein. Dovetailed slots 210 extend at a right angle to the longitudinal axis of the deck board, and serve to receive dovetail inserts 300 therein (FIG. 3), whereby deck boards 200 may be secured to I-beams 100. Deck boards 200 are preferably formed by extrusion (although they may also be formed by another process, e.g., molding), with the bottom dovetailed slots 210 being machined into the bottom of the deck boards.

Figure 3:
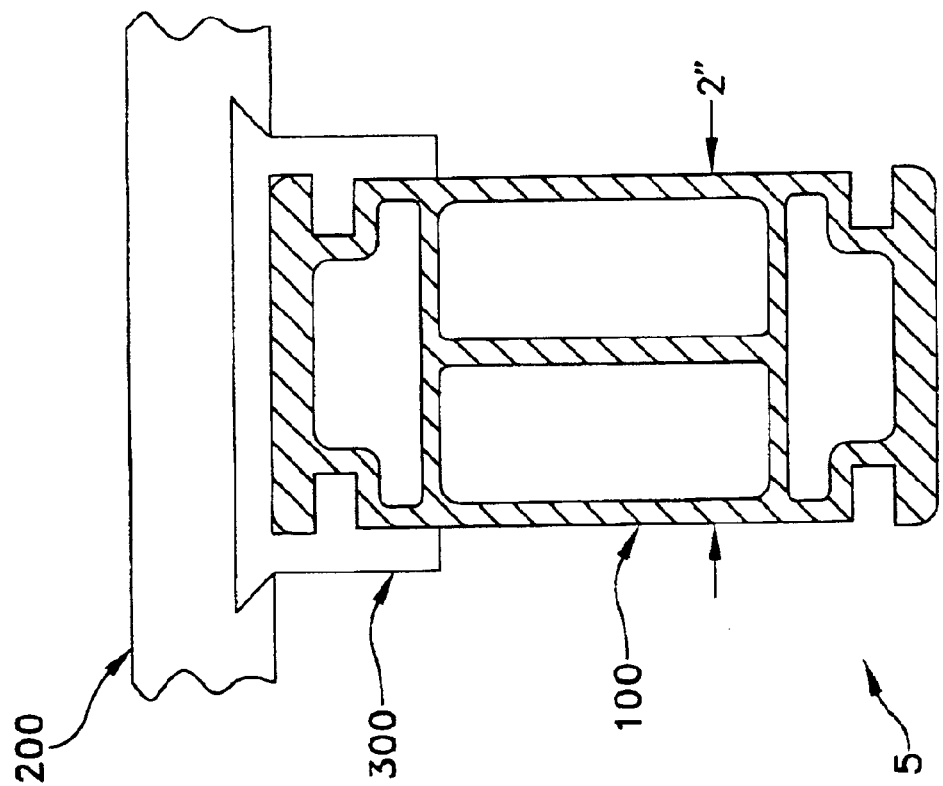
FIG. 3 is a schematic sectional view taken along line 3—3 of FIG. 1.
Figure 4:
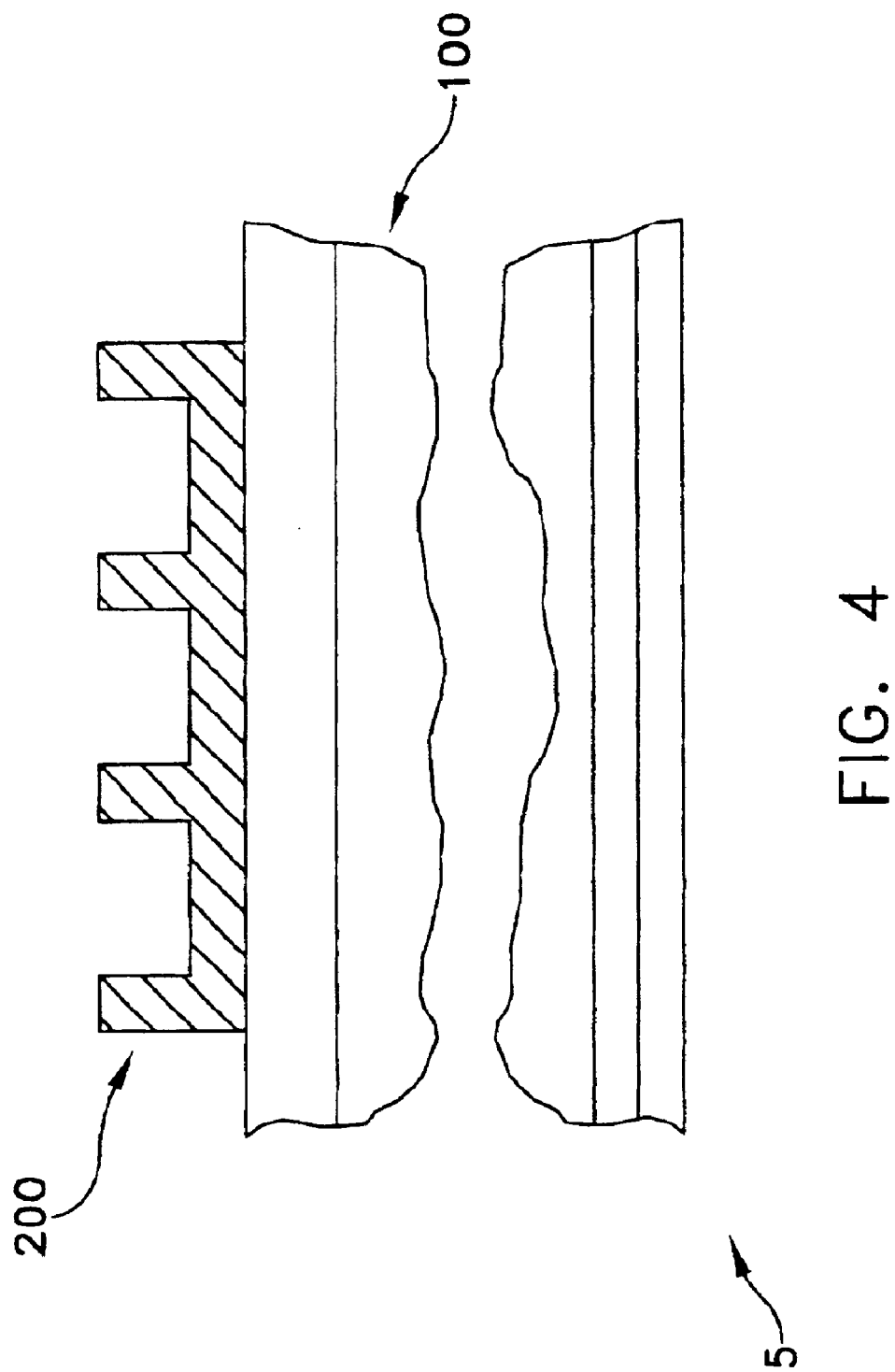
FIG. 4 is a schematic sectional view taken along line 4—4 of FIG. 1.
Figure 5:
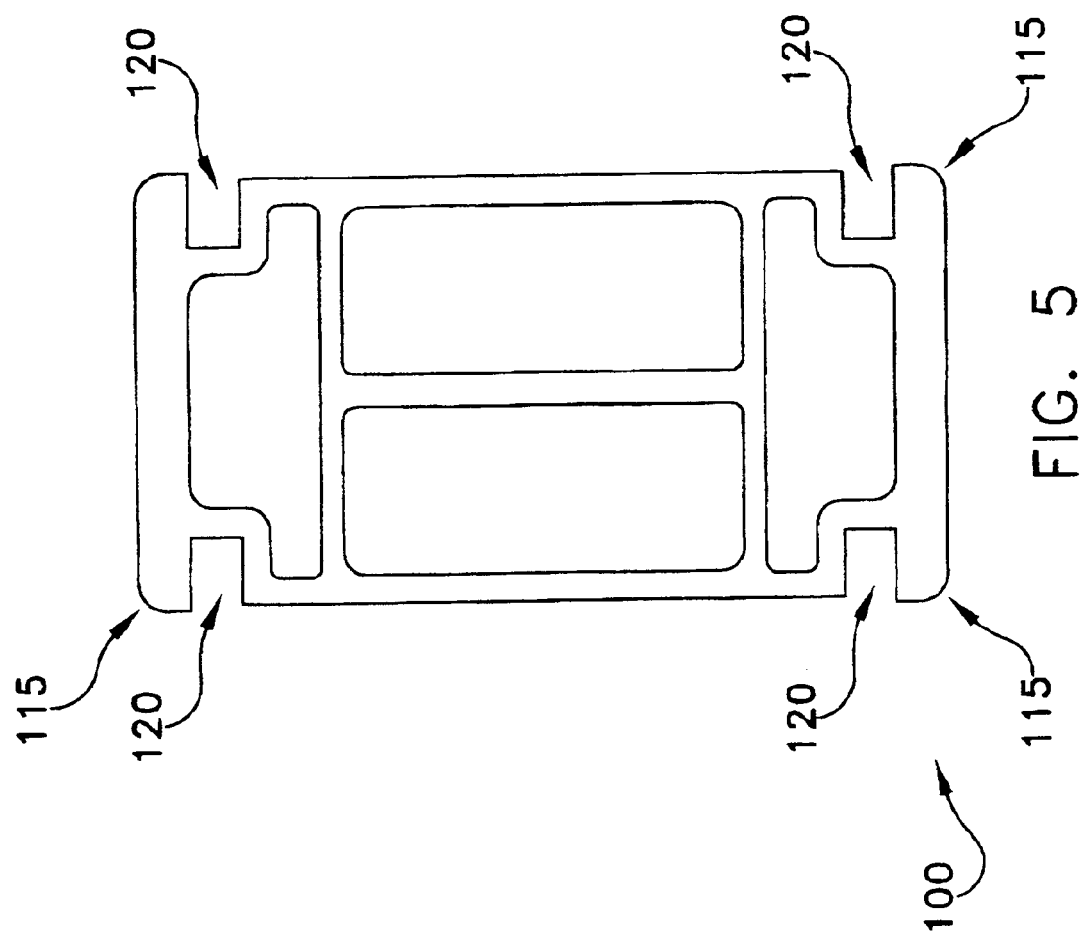
FIG. 5. is a schematic side sectional view of an I-beam component utilized in the construction of the pallet shown in FIG. 1.
Figure 6:
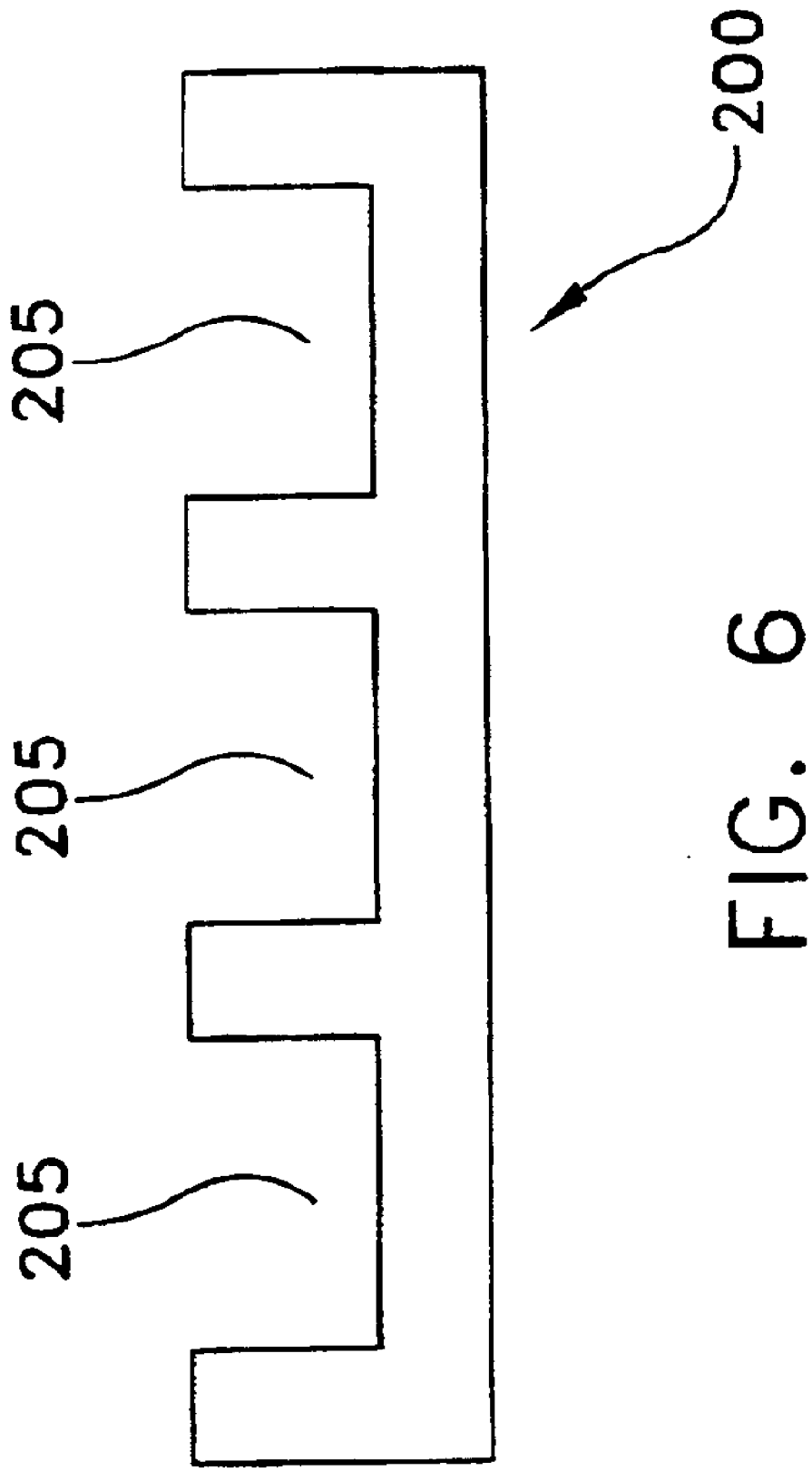
FIG. 6 is a schematic sectional view of a deck board component utilized in the construction of the pallet shown in FIG. 1.
Figure 7:
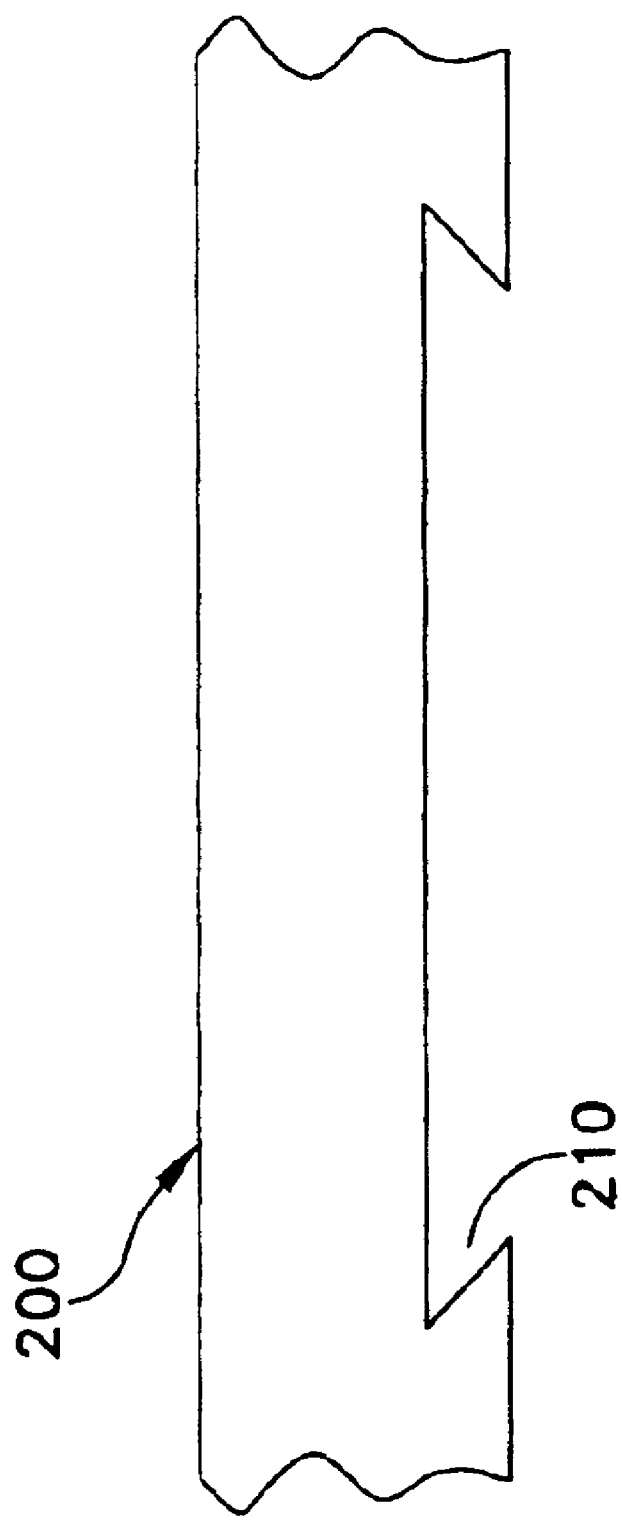
FIG. 7 is a schematic sectional view showing a dovetail slot machined into the bottom of the deck board shown in FIG. 6.
Figure 8:
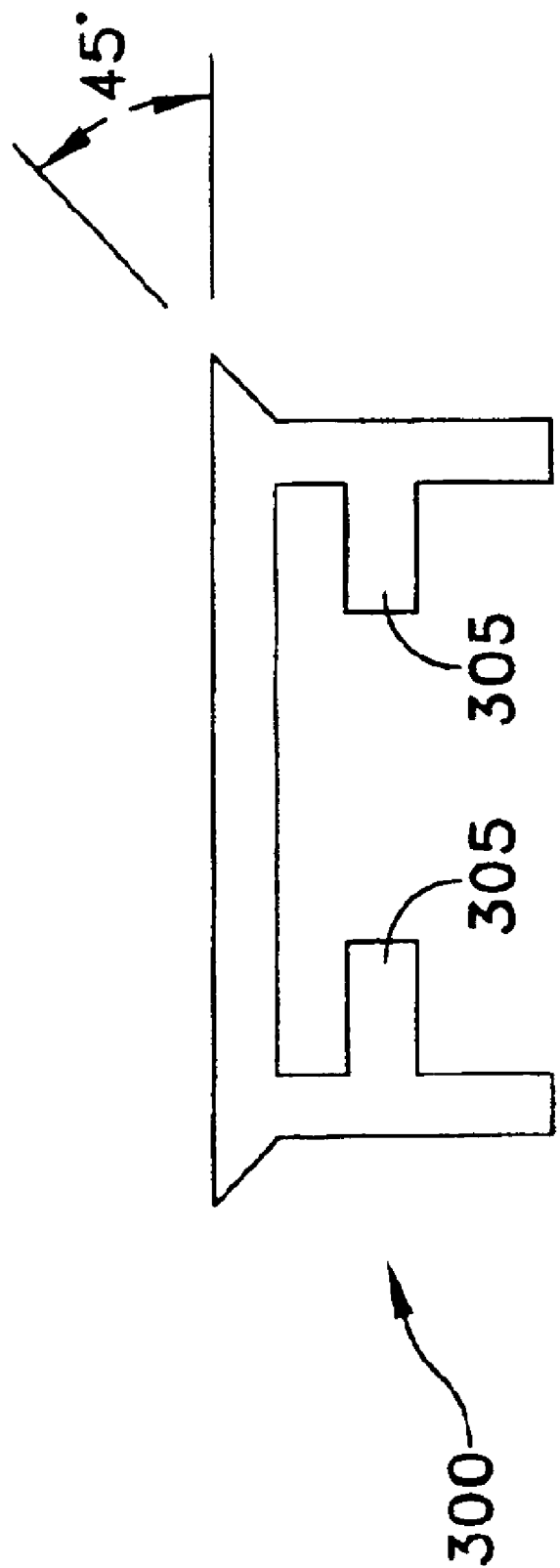
FIG. 8 is a schematic sectional view showing a dovetail insert used to secure the deck board shown in FIG. 6 to the I-beam shown in FIG. 5.
Figure 9:
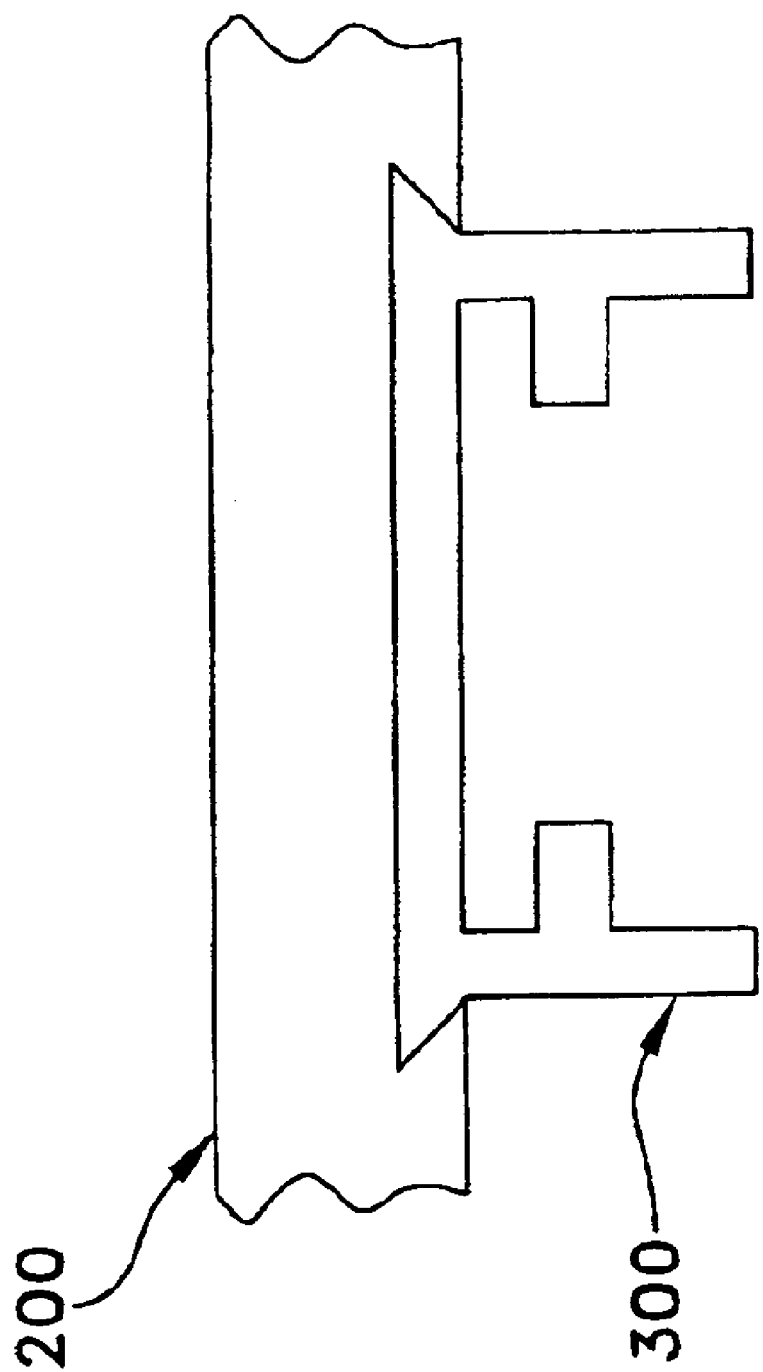
FIG. 9 is a schematic sectional view showing the dovetail insert shown in FIG. 8 installed in the dovetail slot formed in the deck board shown in FIG. 7.

Looking next at FIGS. 3, 8 and 9, dovetail inserts 300 are preferably secured to deck boards 200 by press fitting the dovetail inserts into dovetail slots 210 and then sonically welding the elements together. As a result, dovetail inserts 300 and deck boards 200 together form a subassembly which may then be secured to I-beams 100. To this end, dovetail inserts 300 have a profile which matches corresponding portions of I-beams 100, such that the dovetail inserts 300 (and hence their attached deck boards 200) can be slidingly attached to I-beams 100. More particularly, dovetail inserts 300 include a pair of inwardly extending tongues 305 (FIG. 8) which are received in the inwardly extending grooves 120 (FIG. 5) formed in I-beams 100, in the manner shown in FIG. 3. In this respect it should be appreciated that the inwardly-extending tongues 305 of dovetail insert 300 are preferably slightly longer than the inwardly-extending grooves 120 of I-beams 100, so that compression will be established when the dovetail inserts are slid onto the I-beams (FIG. 3). This compression stabilizes the elements relative to one another so as to give the pallet stability. Dovetail inserts 300 are preferably formed by extrusion (although they may also be formed by another process, e.g., molding).

The inner deck boards 200' can be slid the full length of I-beams 100.

Figure 10:
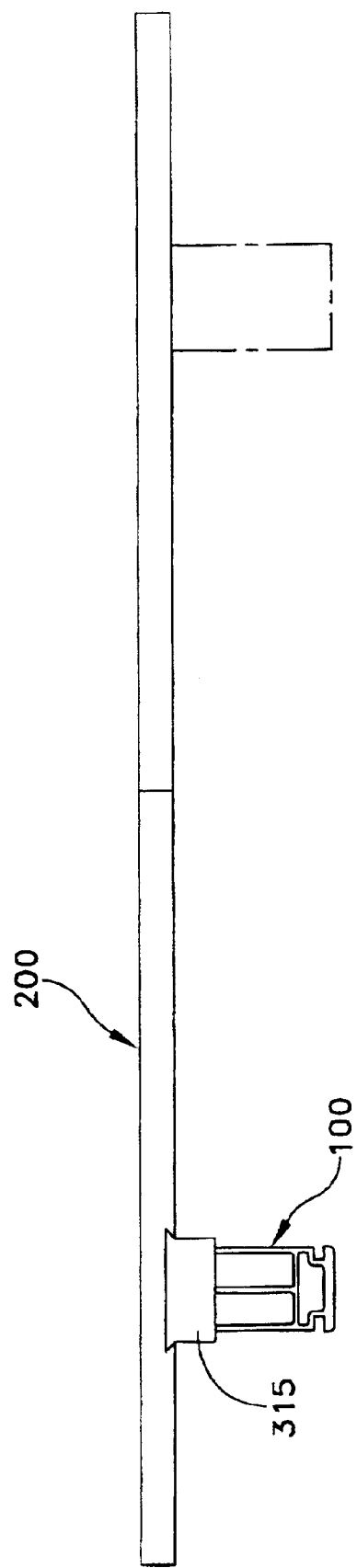
FIG. 10 is a schematic side view showing a stop plate attached to the I-beam.

The outer deck boards 200" include a stop plate 315 (FIG. 10) that restricts the outer board from being forced too far inward along the I-beams. The stop plates 315 are preferably sonically welded to the faces of the dovetail inserts 300. The outer deck boards 200" are used on the two opposing ends of the I-beams so as to form the ends of the pallets.

The pallet is preferably assembled as follows. First, dovetail inserts 300 are secured to deck boards 200 (FIG. 9) and, in the case of the outer deck boards 200A", stop plates 315 (FIG. 10) are attached to the dovetail inserts 300. Then the I-beams 100 are set horizontally on their width by length faces, parallel to one another, and clamped in place. The deck boards 200' are lined up on the I-beams and driven, preferably with a rubber mallet, to their pre-determined locations on the I-beams. Two of the outer deck boards 200" (FIG. 1) are then placed on opposing ends of the I-beams and set in place, thereby completing assembly of the pallet. This assembly operation can generally be accomplished in less than two minutes.

When desired, the pallet can be disassembled by sliding deck boards 200 off I-beams 100.

The novel pallet of the present invention (including, among other things, its extruded I-beams, grooved deck boards and dovetail compression clamps) are unparalleled in the wooden pallet industry. The unlimited availability of a wide variety of material formulations, both current and future, effectively eliminates the aforementioned problems of product contamination, recycling, and landfill rejection, and significantly reduces transportation costs. In addition, the new design increases the product load in airfreight, since the reduced weight of the pallet can be converted into increased working load. The new design also reduces warehousing and storage space, which yields further cost savings.

Significantly, all of the components of the pallet may (but need not) be extruded, which is highly advantageous with respect to ease and cost of manufacture.

Furthermore, the novel dovetail connection established between I-beams 100 and deck boards 200 provides an attachment mechanism which is (1) easy and reliable and inexpensive to manufacture; (2) simple and fast to assemble; (3) strong and effective in operation, able to carry large pallet loads without deformation; (4) simple and fast to disassemble; and (5) reusable.

In addition, due to the modular construction of the pallet, a damaged pallet can be repaired, i.e., any damaged pallet components are removed and replaced by fresh components.

Looking first at FIGS. 11–14, there is shown a novel pallet 5A also formed in accordance with the present invention. Pallet 5A generally comprises a plurality of I-beams 100A and a plurality of deck boards 200A, with I-beams 100A each comprising a dovetail projection 300A (FIG. 13) and deck boards 200A each comprising a dovetailed slot 210A which are used to connect deck boards 200A and I-beams 10A.

In general, pallet 5A is intended to be manufactured out of environmentally safe, recyclable polymers and copolymers that are preferably formulated with ultraviolet inhibitors (to resist degradation from the sun) and with modifiers (for strength). Currently, the choice of materials includes acrylics, rubbers, ethylenes, propylenes, urethanes, styrene glasses and structural foams. However, the present invention is not restricted to these particular materials; other appropriate materials may also be used. In this respect it should be appreciated that the particular materials used, and their specific formulations, may be varied according to a variety of factors including strength, durability, cost, etc. Thus, the choice of materials may be influenced by the weight of the load which is to be carried by the pallet. For example, where the pallet is to be used to carry a relatively light load (e.g., cornflakes), a particular blend may be used; correspondingly, where the pallet is to be used to carry a relatively heavy load (e.g., cinderblocks), a different blend may be used. Varying the formulation to suit the load may reduce the cost of the pallet where the pallet is intended to be consistently used with particular types of loads.

Specific colors can be introduced to the formulation at the customer's request. The use of different colors in the pallets can help with product identification in inventory and warehousing.

Also, company logos can be permanently embossed into the pallet for recognition, thereby facilitating return of the pallet to the proper owner.

Looking next at FIGS. 11–15, a plurality of I-beams 100A generally form the foundation of pallet 5A. I-beams 100A are preferably formed by extrusion (although they may also be formed by another process, e.g., molding) and may have any desired length. In one preferred form of the invention, I-beams 100A have a length of approximately 36.5 inches. I-beams 100A have a cross-sectional configuration which is designed to provide maximum strength with minimum weight. In one preferred form of the invention, the interior of the I-beam is cored out so as to reduce weight while maintaining adequate strength in the vertical and horizontal planes. Each I-beam is preferably four inches high by two inches wide. In this respect it should be appreciated that the four inch height generally facilitates forklift and pallet jack entry into the completed pallet, such that the pallet can be lifted and moved about. Preferably the leading and trailing edges of each I-beam are rounded off, e.g., at 105A (FIG. 12), so as to reduce friction when the pallet is pushed or dragged forward. Alternatively, for rack mounting, the leading and tailing edges may be squared off, or they may be otherwise tailored for a particular application.

If desired, oval cutouts 110A (FIG. 12) may also be formed in the I-beams after extruding, e.g., by machining. Such cutouts 110A permit forklift entry into the sides of the completed pallet, such that the pallet can be addressed from the sides (i.e., perpendicular to I-beams 100A) as well as from the ends (i.e., parallel to I-beams 100A). Preferably the side edges of each I-beam are rounded off, e.g., at 115A (FIG. 15), so as to reduce friction when the pallet is pushed or dragged sideways and to eliminate stress points (in this configuration, pallet 5A generally comprises a single, i.e., upper, face of deck boards 200A). It is also preferable to locate oval cutouts 110A through a lower portion of the sidewalls of the I-beams, so as to provide a continuous crossbar 120A (FIGS. 13 and 15) above oval cutouts 110A.

Dovetail projections 300A (FIG. 13) are formed in the sidewalls of the I-beam near the top of the beam. These projections 300A are received by dovetailed slots 210A formed in deck boards 200A, whereby deck boards 200A may be secured to I-beams 10A, as will hereinafter be described in further detail.

Figure 11:
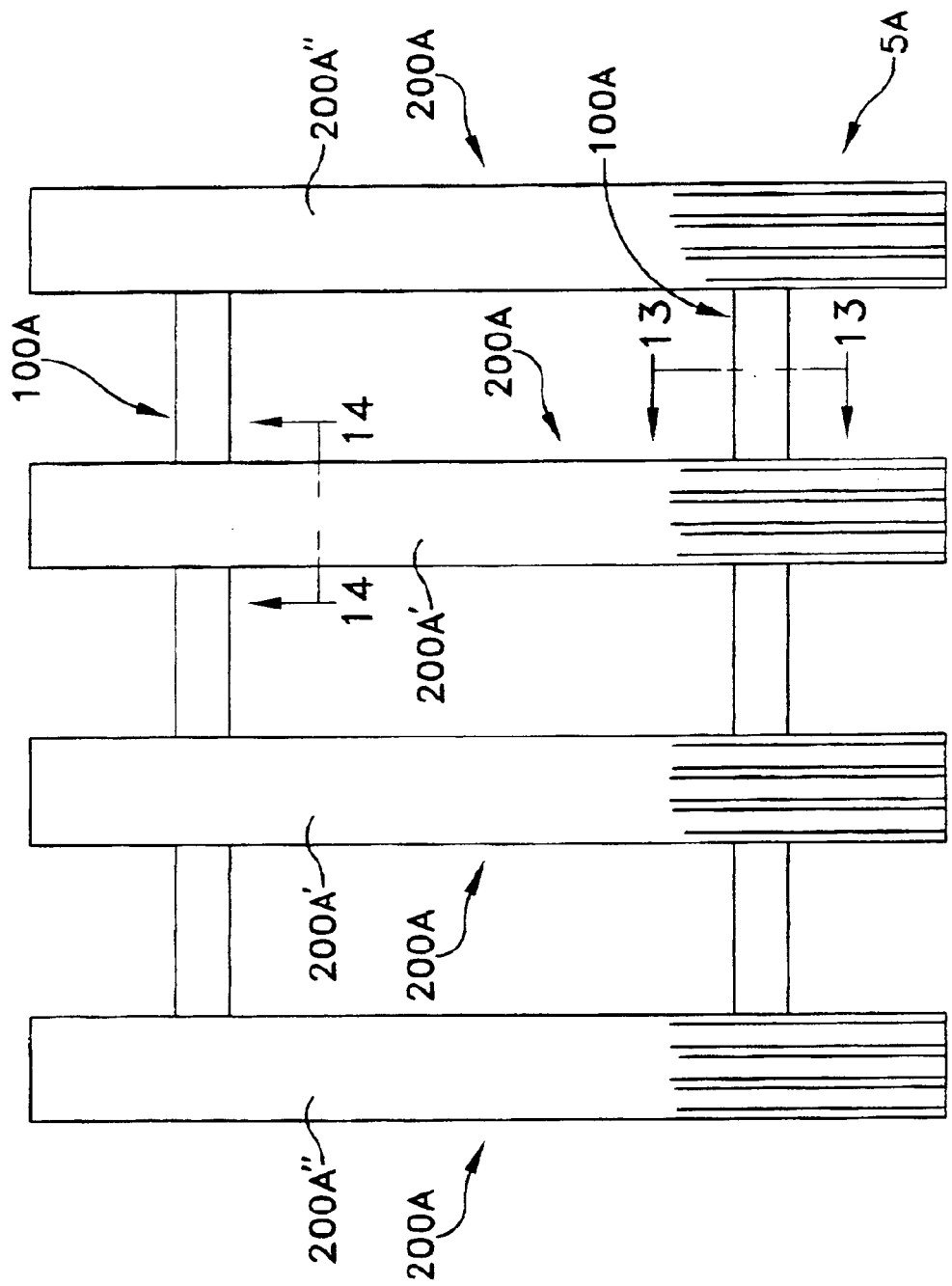
FIG. 11 is a schematic top view of another novel pallet formed in accordance with the present invention.
Figure 12:
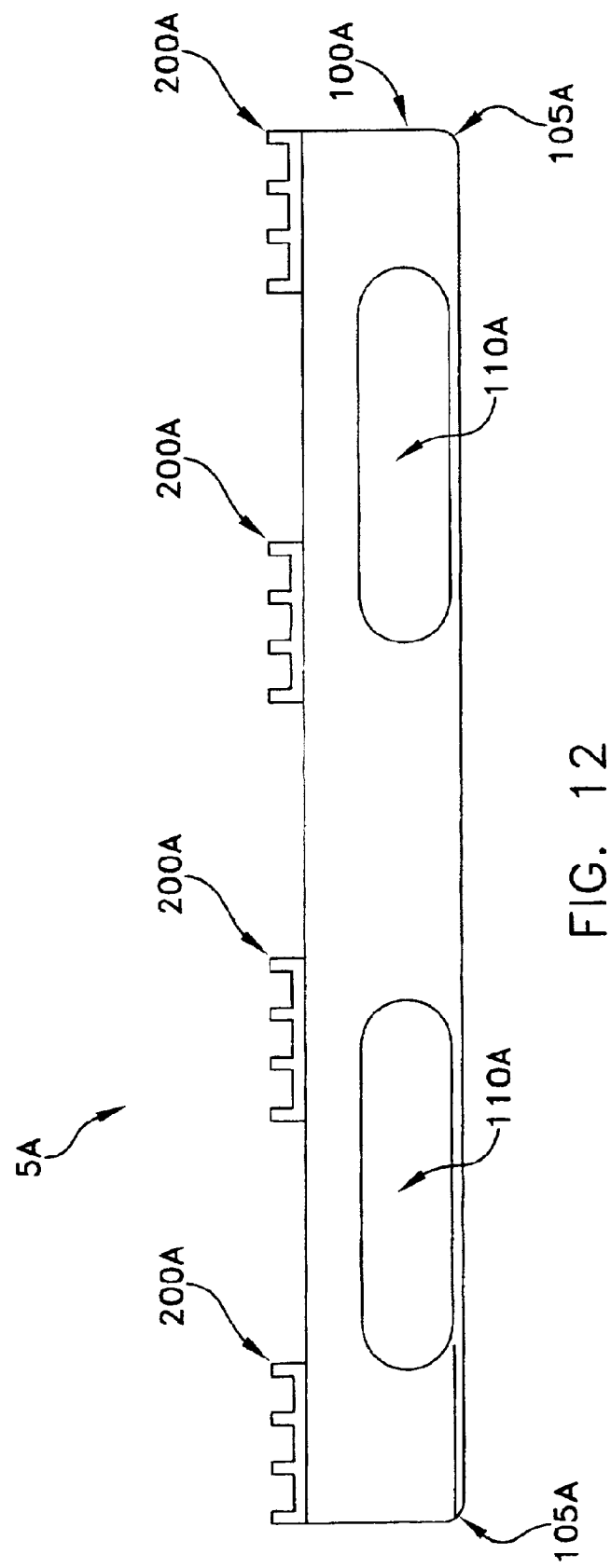
FIG. 12 is a schematic front view of the novel pallet shown in FIG. 11.
Figure 13:
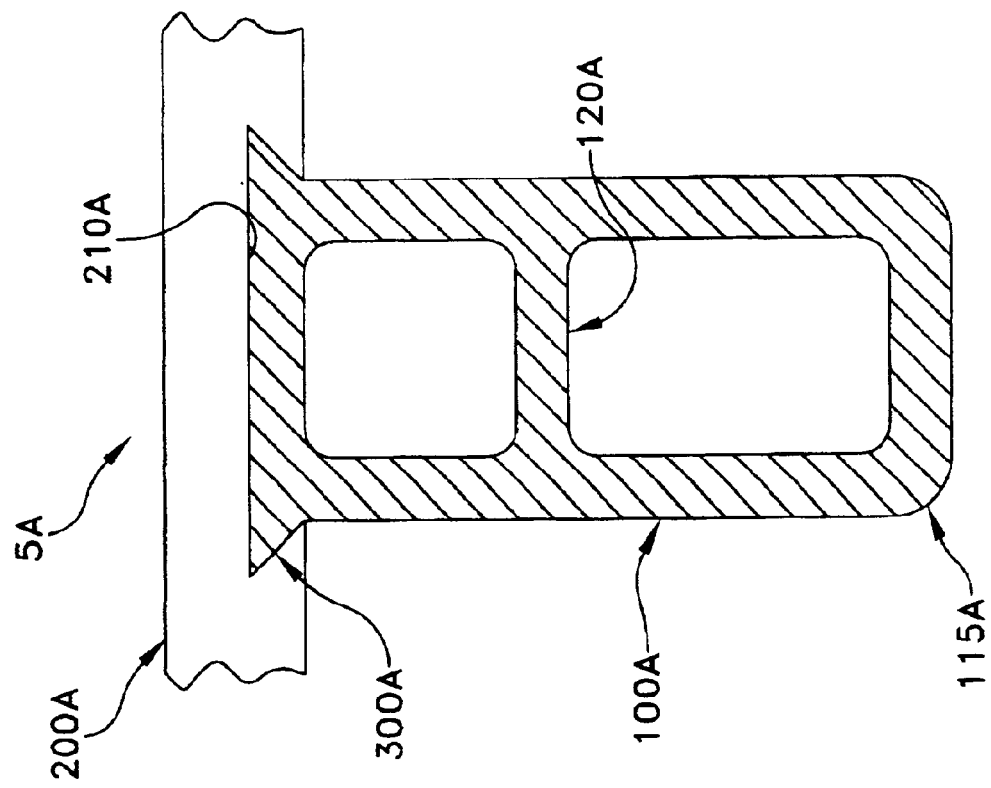
FIG. 13 is a schematic sectional view taken along line 13—13 of FIG. 11.
Figure 14:
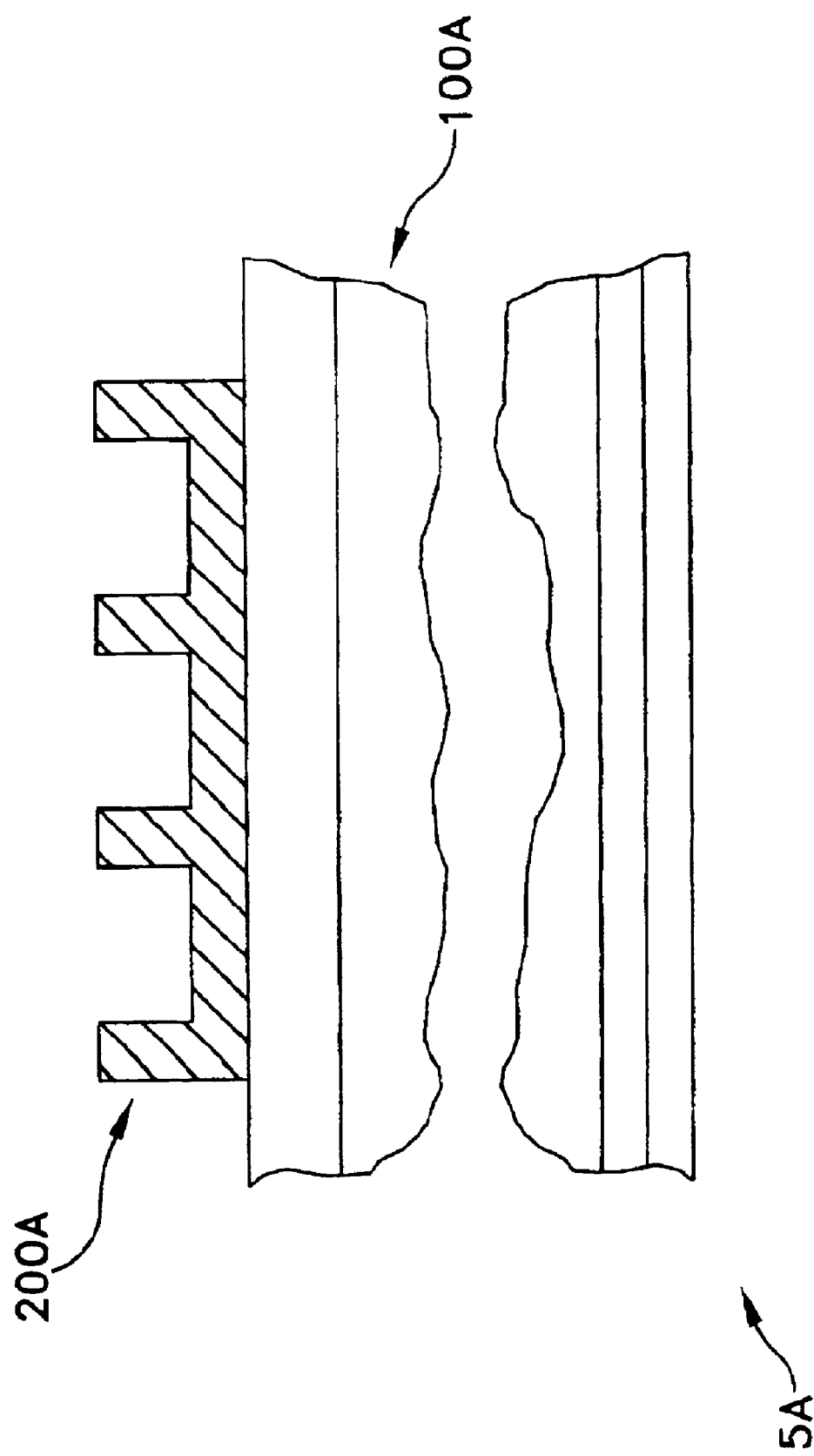
FIG. 14 is a schematic sectional view taken along line 14—14 of FIG. 11.
Figure 15:
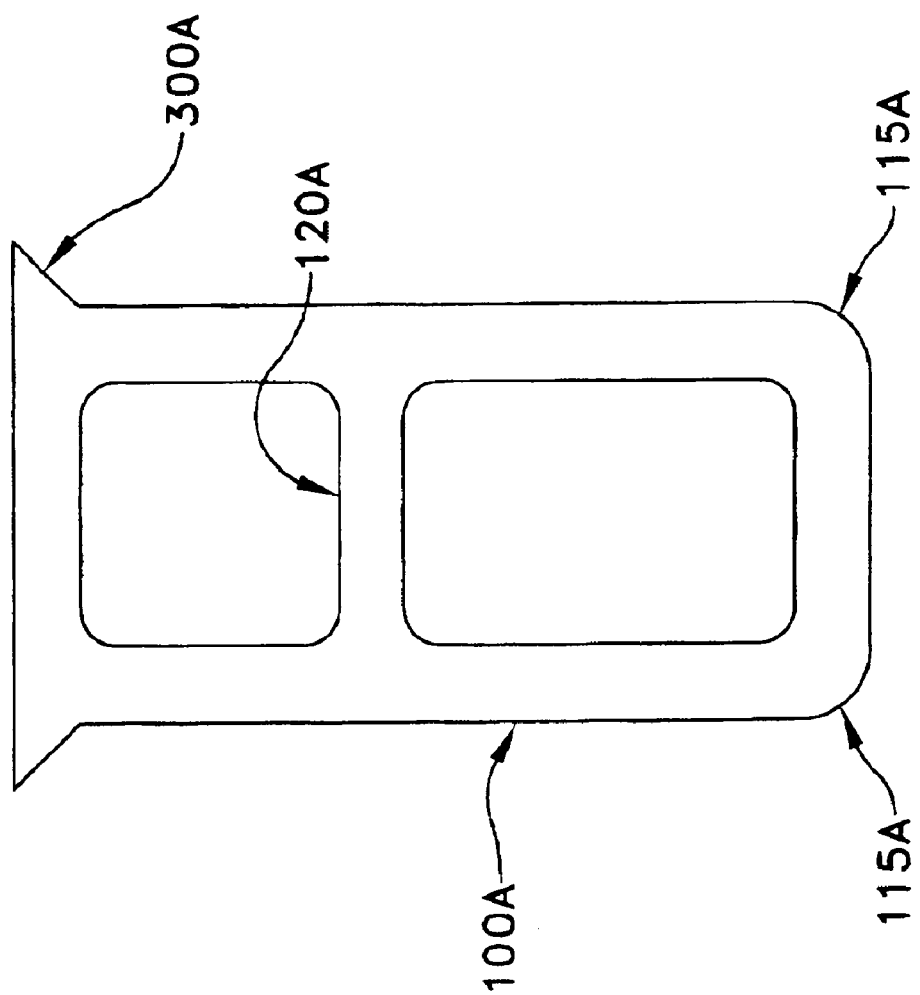
FIG. 15 is a schematic side sectional view of an I-beam component, including an integral dovetail portion, utilized in the construction of the pallet shown in FIG. 11.
Figure 16:
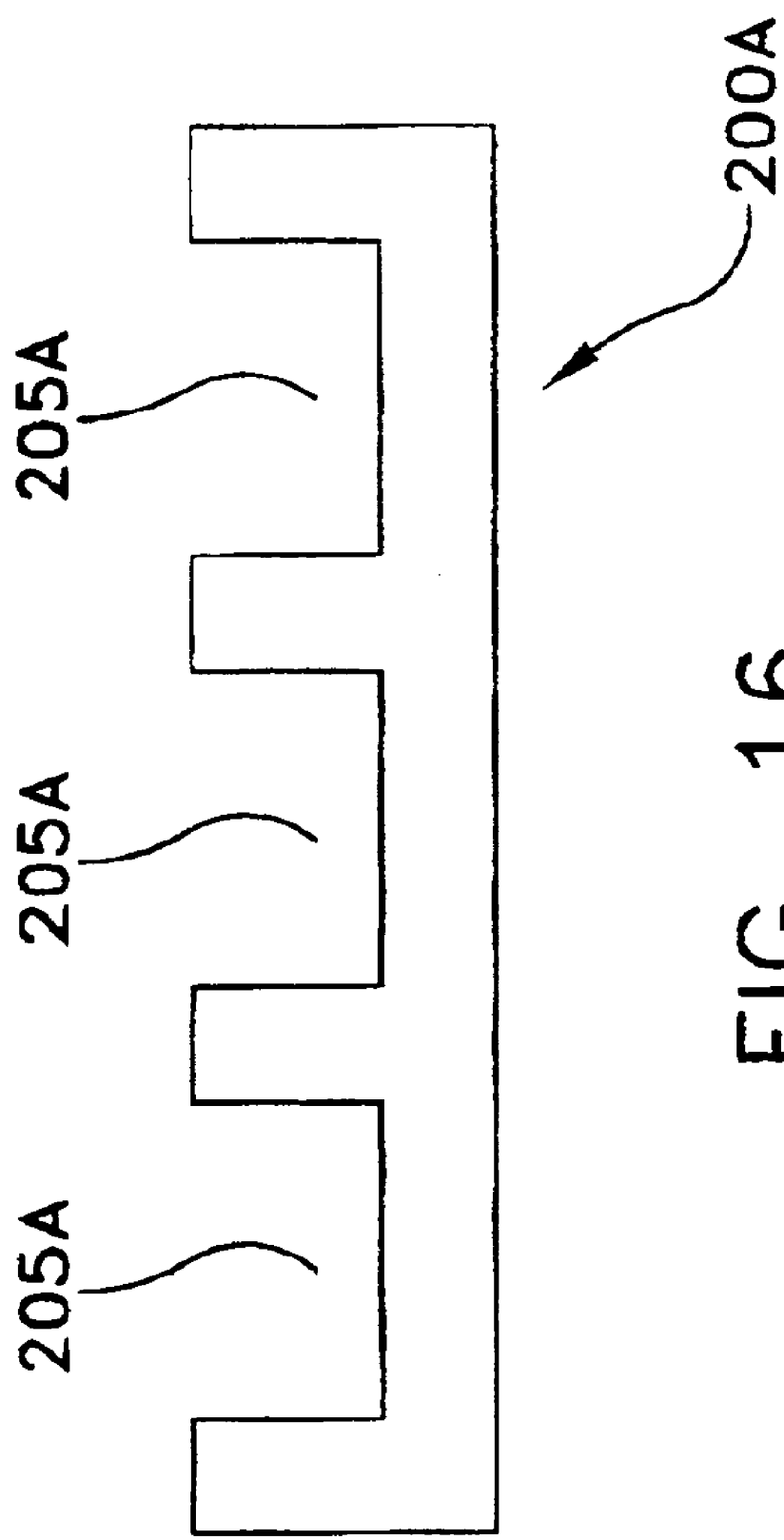
FIG. 16 is a schematic sectional view of a deck board component utilized in the construction of the pallet shown in FIG. 11.
Figure 17:
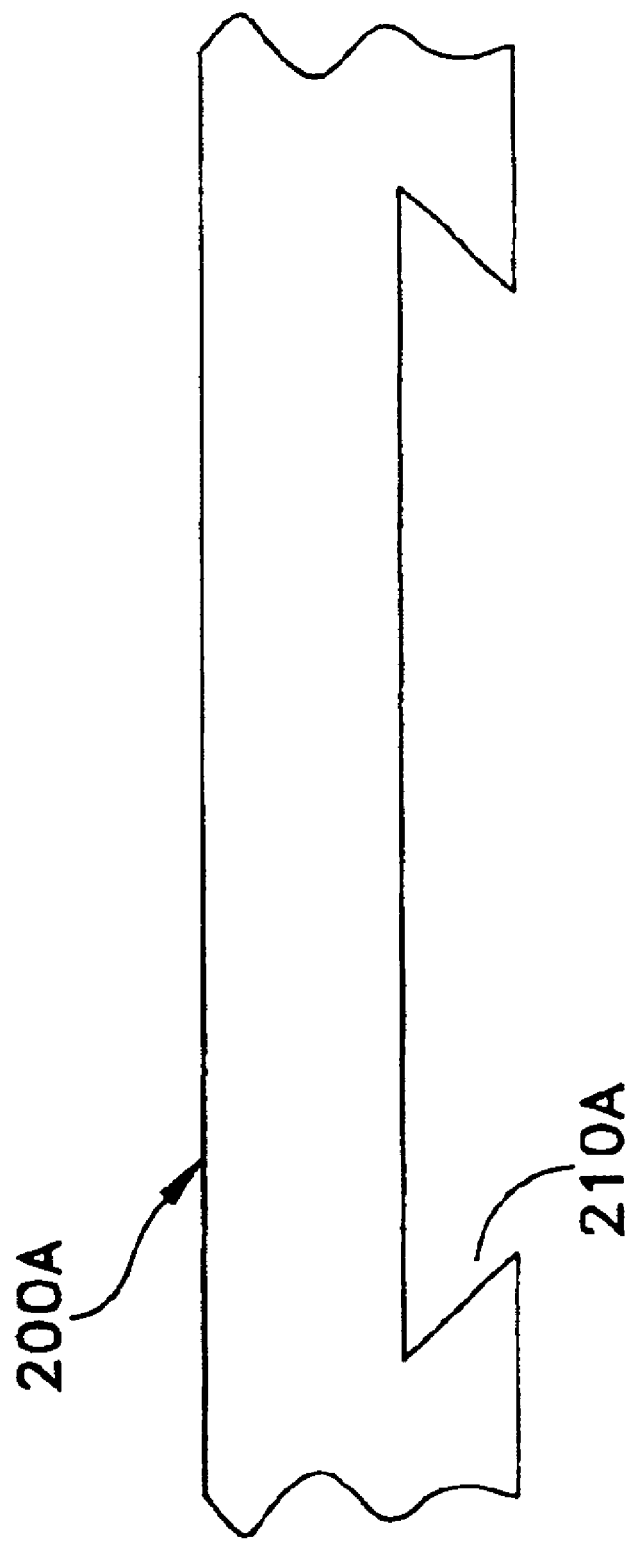
FIG. 17 is a schematic sectional view showing a dovetail slot machined into the bottom of the deck board shown in FIG. 16.

Looking next at FIGS. 11–14 and 16–19C, a plurality of deck boards 200A form the upper surface of pallet 5A. Deck boards 200A are of two types: inner deck boards 200A' (FIG. 11) and outer deck boards 200A" (FIG. 11). Inner deck boards 200A' and outer deck boards 200A" are preferably identical to one another, except as will hereinafter be described.

Deck boards 200A are generally similar to a slat, except that they preferably have a series of parallel grooves 205A (FIG. 16) on the top surface thereof which serve as gutters for liquid (e.g., rainwater) run-off. This configuration reduces the amount of standing water that will contact the packaged product resting on the pallet and reduces pallet weight without sacrificing pallet strength.

The bottom surfaces of the deck boards 200A have dovetailed slots 210A (FIG. 17 and 19A–19C) formed therein. Dovetailed slots 210A extend at a right angle to the longitudinal axis of the deck board, and serve to receive I-beam projections 300A therein (FIG. 13), whereby deck boards 200A may be secured to I-beams 10A. Deck boards 200A are preferably formed by extrusion (although they may also be formed by another process, e.g., molding), with the bottom dovetailed slots 210A being machined into the bottom of the deck boards.

Looking next at FIGS. 13, 18 and 19A–19C, deck boards 200A are secured to I-beams 100A by press fitting the dovetail projections 300A of the I-beams 100A into dovetail slots 210A. To this end, dovetailed slots 210A have a profile which matches corresponding dovetail projections 300A of I-beams 100A, such that deck boards 200A can be slidingly attached to I-beams 10A.

The inner deck boards 200A' can be slid the full length of I-beams 10A.

The outer deck boards 200A" include dovetailed slots 210A" (FIGS. 19A–19C) extending only partially thereacross so as to restrict the outer deck board from being forced too far inward along the I-beams. The outer deck boards 200A" are used on the two opposing ends of the I-beams so as to form the ends of the pallets.

The pallet is preferably assembled as follows. First, dovetail projections 300A of I-beams 100A are inserted into dovetailed slots 210A of inner deck boards 200'. Two of the outer deck boards 200A" (FIG. 11) are then placed on opposing ends of the I-beams and dovetail projections 300A of I-beams 100A are inserted into dovetailed slots 210A" of outer deckboards 200A", thereby completing assembly of the pallet. This assembly operation can generally be accomplished in less than two minutes.

When desired, the pallet can be disassembled by sliding deck boards 200A off I-beams 10A.

The novel pallet of the present invention (including, among other things, its extruded I-beams, grooved deck boards and dovetail attachment) are unparalleled in the wooden pallet industry. The unlimited availability of a wide variety of material formulations, both current and future, effectively eliminates the aforementioned problems of product contamination, recycling, and landfill rejection, and significantly reduces transportation costs. In addition, the new design increases the product load in airfreight, since the reduced weight of the pallet can be converted into increased working load. The new design also reduces warehousing and storage space, which yields further cost savings.

Significantly, all of the components of the pallet may (but need not) be extruded, which is highly advantageous with respect to ease and cost of manufacture.

Furthermore, the novel dovetail connection established between I-beams 100 and deck boards 200 provides an attachment mechanism which is (1) easy and reliable and inexpensive to manufacture; (2) simple and fast to assemble; (3) strong and effective in operation, able to carry large pallet loads without deformation; (4) simple and fast to disassemble; and (5) reusable.

In addition, due to the modular construction of the pallet, a damaged pallet can be repaired, i.e., any damaged pallet components are removed and replaced by fresh components.

A novel reusable shipping pallet, formed from extruded plastic parts which are easily assembled and disassembled, has been disclosed. While various preferred embodiments have been described and illustrated, it will be understood that there is no intent to limit the invention by such disclosure but, rather, it is intended to cover all modifications and alternate constructions falling within the spirit and scope of the invention.

What is claimed is:

1. A reusable shipping pallet formed from extruded plastic parts, said pallet comprising:

at least two I-beam constructs, each of said I-beam constructs having a first beam end, a second beam end and a longitudinal beam axis extending therethrough, each of said I-beam constructs having a top beam portion and a bottom beam portion, and each of said I-beam constructs having a dovetail projection along said top beam portion and extending in a direction parallel to said longitudinal beam axis; and at least one deck board having a first board end, a second board end and a longitudinal board axis extending therethrough, said at least one deck board having a top board portion and a bottom board portion, said at least one deck board having at least two dovetail slots in said bottom board portion, each one of said at least two dovetail slots being substantially perpendicular to said longitudinal board axis and being configured to form an interlocking joint with said dovetail projection, and said top board portion of said at least one deck board configured to support items thereon;

wherein said pallet is assembled by inserting each of said dovetail projections into a corresponding dovetail slot of said at least one deck board.

2. A pallet according to claim 1 wherein at least a portion of said extruded plastic parts comprises an ultraviolet inhibitor therein so as to prevent degradation from sunlight.

3. A pallet according to claim 1 wherein at least a portion of said extruded plastic parts comprises modifiers therein so as to provide additional structural strength for a heavy load.

4. A pallet according to claim 1 wherein at least a portion of said extruded plastic parts comprises a material selected from a group consisting of acrylics, rubbers, ethylenes, propylenes, urethanes, styrene glasses and structural foams.

5. A pallet according to claim 4 wherein said material is selected based on a required structural strength for an intended load.

6. A pallet according to claim 1 wherein at least a portion of said extruded plastic parts is colored for identification.

7. A pallet according to claim 1 wherein at least a portion of said extruded plastic parts contains a void therein so as to provide adequate structural strength for an intended load with said pallet having a lightweight construction.

8. A pallet according to claim 7 wherein said void in said I-beam construct is a cored out portion along said longitudinal beam axis.

9. A pallet according to claim 1 wherein each of said I-beam constructs has a leading edge at said bottom beam portion of said first beam end, and a trailing edge at said bottom beam portion of said second beam end, and each of said leading edge and said trailing edge has a rounded shape so as to reduce a frictional force generated when said pallet is at least one of pushed forward and dragged backward.

10. A pallet according to claim 1 wherein each of said I-beam constructs forms a pair of passages therethrough, said pair of passages extending between said top beam portion and said bottom beam portion, and said pair of passages extending in a direction orthogonal to said longitudinal beam axis so as to permit forklift entry into sides of said pallet.

11. A pallet according to claim 10 wherein said pair of passages is disposed closer to said bottom beam portion.

12. A pallet according to claim 10 wherein each of said pair of passages has a substantially oval cross-sectional shape.

13. A pallet according to claim 10 wherein said pair of passages are formed by a second process after forming each of said I-beam constructs by extrusion.

14. A pallet according to claim 13 wherein said second process is machining.

15. A pallet according to claim 1 wherein each of said I-beam constructs has a first edge and a second edge in opposition to one another and parallel to said longitudinal axis, and each of said first edge and said second edge has a rounded shape, so as to reduce friction when said pallet is at least one of pushed and pulled in a direction substantially orthogonal to said longitudinal beam axis.

16. A pallet according to claim 1 wherein said at least one deck board forms three dovetail slots therein so as to receive the dovetail projections of three I-beam constructs therethrough.

17. A pallet according to claim 1 wherein said at least one deck board comprises two outer deck boards and at least one inner deck board therebetween, said inner deck boards being configured to allow said dovetail projections to pass completely through said dovetail slots contained therein, and said two outer deck boards having stop means for restricting said dovetail projections from passing completely through said dovetail slots contained therein.

18. A pallet according to claim 17 wherein said stop means comprise said dovetail slots of each of said two outer deck boards extending only partially thereacross so as to restrict each of said two outer deck boards from being configured inward of said first beam end and said second beam end of each of said I-beam constructs, respectively.

19. A pallet according to claim 1 wherein each of said plurality of said deck boards comprise a series of parallel grooves in said top board portion, and said series of parallel grooves being substantially parallel to said longitudinal board axis.

20. A pallet according to claim 1 wherein each of said I-beam constructs comprises an integral configuration of said dovetail portion of said top beam portion with said bottom beam portion, respectively.

21. A pallet according to claim 1 wherein each of said I-beam constructs comprises a modular configuration of said dovetail portion of said top beam portion and said bottom beam portion, and further wherein said top beam portion comprises a first tongue and second tongue, said bottom beam portion forms a first groove and a second groove therein, and said top beam portion and said bottom beam portion are joined by interlocking said first tongue and second tongue with said first groove and said second groove, respectively.

22. A pallet according to claim 1 further comprising an additional dovetail projection being disposed on said bottom beam portion of each of said I-beam constructs, said additional dovetail projection and said dovetail projection being in opposition to one another, and said additional dovetail projection being configured for attachment with a plurality of deck boards so as to form a pallet having a generally symmetrical configuration of said top beam portion and said bottom beam portion relative to one another.

23. A method for assembling a reusable shipping pallet formed from extruded plastic parts, said method comprising:
    providing a reusable shipping pallet formed from extruded plastic parts, said pallet comprising:
        at least two I-beam constructs, each of said I-beam constructs having a first beam end, a second beam end and a longitudinal beam axis extending therethrough, each of said I-beam constructs having a top beam portion and a bottom beam portion, and each of said I-beam constructs having a dovetail projection along said top beam portion and extending in a direction parallel to said longitudinal beam axis; and
        at least one deck board having a first board end, a second board end and a longitudinal board axis extending therethrough, said at least one deck board having a top board portion and a bottom board portion, said at least one deck board having at least two dovetail slots in said bottom board portion, each one of said at least two dovetail slots being substantially perpendicular to said longitudinal board axis and being configured to form an interlocking joint with said dovetail projection, and said top board portion of said at least one deck board configured to support items thereon; and
    inserting each of said dovetail projections into a corresponding dovetail slot of said at least one deck board.

24. A method for assembling a reusable pallet according to claim 23 further comprising the step of placing two outer deck boards on each of said I-beam constructs at said first beam end and said second beam end, respectively, wherein said outer deck boards comprise stop means for restricting said dovetail projections from passing completely through said dovetail slots contained in said outer deck boards.

25. A method for assembling a reusable pallet according to claim 23 further comprising the step of removing each of said at least one deck board from said I-beam constructs so as to disassemble said pallet for re-assembly at another time.

26. A reusable shipping pallet formed from extruded plastic parts, said pallet comprising:

at least two I-beam constructs, each of said I-beam constructs having a first beam end, a second beam end and a longitudinal beam axis extending therethrough, each of said I-beam constructs having a top beam portion and a bottom beam portion, and each of said I-beam constructs having a dovetail projection along said top beam portion and extending in a direction parallel to said longitudinal beam axis; and at least one deck board having a first board end, a second board end and a longitudinal board axis extending therethrough, said at least one deck board having a top board portion and a bottom board portion, said at least one deck board having at least two dovetail slots in said bottom board portion, said dovetail slots being substantially perpendicular to said longitudinal board axis and being configured to compliment a shape of said dovetail projection;

wherein said pallet is assembled by inserting each of said dovetail projections into a corresponding dovetail slot of said at least one deck board; and wherein each of said I-beam constructs comprises a modular configuration of said dovetail portion of said top beam portion and said bottom beam portions and further wherein said top beam portion comprises a first tongue and second tongue, said bottom beam portion forms a first groove and a second groove therein, and said top beam portion and said bottom beam portion are joined by interlocking said first tongue and second tongue with said first groove and said second groove, respectively.

* * * * *